(12) United States Patent
Vu et al.

(10) Patent No.: US 10,002,630 B1
(45) Date of Patent: Jun. 19, 2018

(54) ADAPTIVE ATTENUATION FOR DISTURBANCE COMPENSATION

(71) Applicant: Seagate Technology LLC, Cupertino, CA (US)

(72) Inventors: Hoang Dung Vu, Singapore (SG); Xiang Lu, Singapore (SG); GuoQing Zhang, Singapore (SG); Chan Fan Lau, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/636,438

(22) Filed: Jun. 28, 2017

(51) Int. Cl.
*G11B 21/02* (2006.01)
*G11B 5/596* (2006.01)
*G11B 5/55* (2006.01)

(52) U.S. Cl.
CPC ........ *G11B 5/59622* (2013.01); *G11B 5/5582* (2013.01)

(58) Field of Classification Search
CPC ..... G11B 5/5552; G11B 5/5521; G11B 5/596; G11B 5/5547; G11B 5/6005; G11B 5/59633; G11B 5/54

USPC .......... 360/78.05, 78.12, 78.13, 75
See application file for complete search history.

(56) References Cited

U.S. PATENT DOCUMENTS

| 5,852,524 A * | 12/1998 | Glover ............... G11B 5/588 360/48 |
| 9,536,553 B1 | 1/2017 | Seo et al. |
| 2017/0011763 A1 * | 1/2017 | Zheng ............... G11B 5/556 |

* cited by examiner

*Primary Examiner* — Nabil Hindi
(74) *Attorney, Agent, or Firm* — Faegre Baker Daniels LLP (57) ABSTRACT

An apparatus includes a frequency analyzer circuitry, filter circuitry, and voice coil motor (VCM) control circuitry. The frequency analyzer circuitry is configured to detect one or more dominant frequencies of a position error signal (PES). The filter circuitry is configured to identify one or more filters in response to detecting the one or more dominant frequencies, apply the one or more identified filters to at least one of a microactuator control signal and PES, and generate a VCM compensation signal in response to the filtered PES or the microactuator control signal. The VCM control circuitry is configured to generate a VCM control signal in response to the VCM compensation signal.

18 Claims, 10 Drawing Sheets

ADAPTIVE ATTENUATION FOR DISTURBANCE COMPENSATION

SUMMARY

In certain embodiments, an apparatus includes a frequency analyzer circuitry, filter circuitry, and voice coil motor (VCM) control circuitry. The frequency analyzer circuitry is configured to detect one or more dominant frequencies of a position error signal (PES). The filter circuitry is configured to identify one or more filters in response to detecting the one or more dominant frequencies, apply the one or more identified filters to at least one of a microactuator control signal and PES, and generate a VCM compensation signal in response to the filtered PES or the microactuator control signal. The VCM control circuitry is configured to generate a VCM control signal in response to the VCM compensation signal.

In certain embodiments, a method includes detecting one or more dominant frequencies of a position error signal (PES), identifying one or more filters in response to detecting the one or more dominant frequencies, applying the one or more identified filters to either the PES or a microactuator control signal, generating a voice coil motor (VCM) compensation signal in response to the filtered PES or filtered microactuator control signal, and generating a VCM control signal in response to the VCM compensation signal.

In certain embodiments, an integrated circuit includes means for detecting one or more dominant frequencies of a position error signal (PES), means for generating a voice coil motor (VCM) compensation signal in response to the detected one or more dominant frequencies, and means for generating a VCM control signal in response to the VCM compensation signal.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to servo control systems, including single- and multi-stage actuation systems, and more particularly to disturbance compensation approaches for use in servo control systems.

Hard drives typically implement one of several approaches for addressing vibrations via the servo control system. Some approaches involve incorporating input from one or more vibrations sensors. However, vibration sensors are expensive and may consume valuable real estate. Other approaches involve designing disturbance observers into the servo control system. However, disturbance observers may not be effective at high frequencies and typically add unwanted complexity to the servo control system.

Accordingly, certain embodiments of the present disclosure feature servo control systems that utilize various frequency analyzers and filters that can be used and applied in real time to help compensate for disturbances. The described embodiments do not necessarily require use of vibration sensors or disturbance observers—although such features could be incorporated into the described servo control systems.

Figure 1:
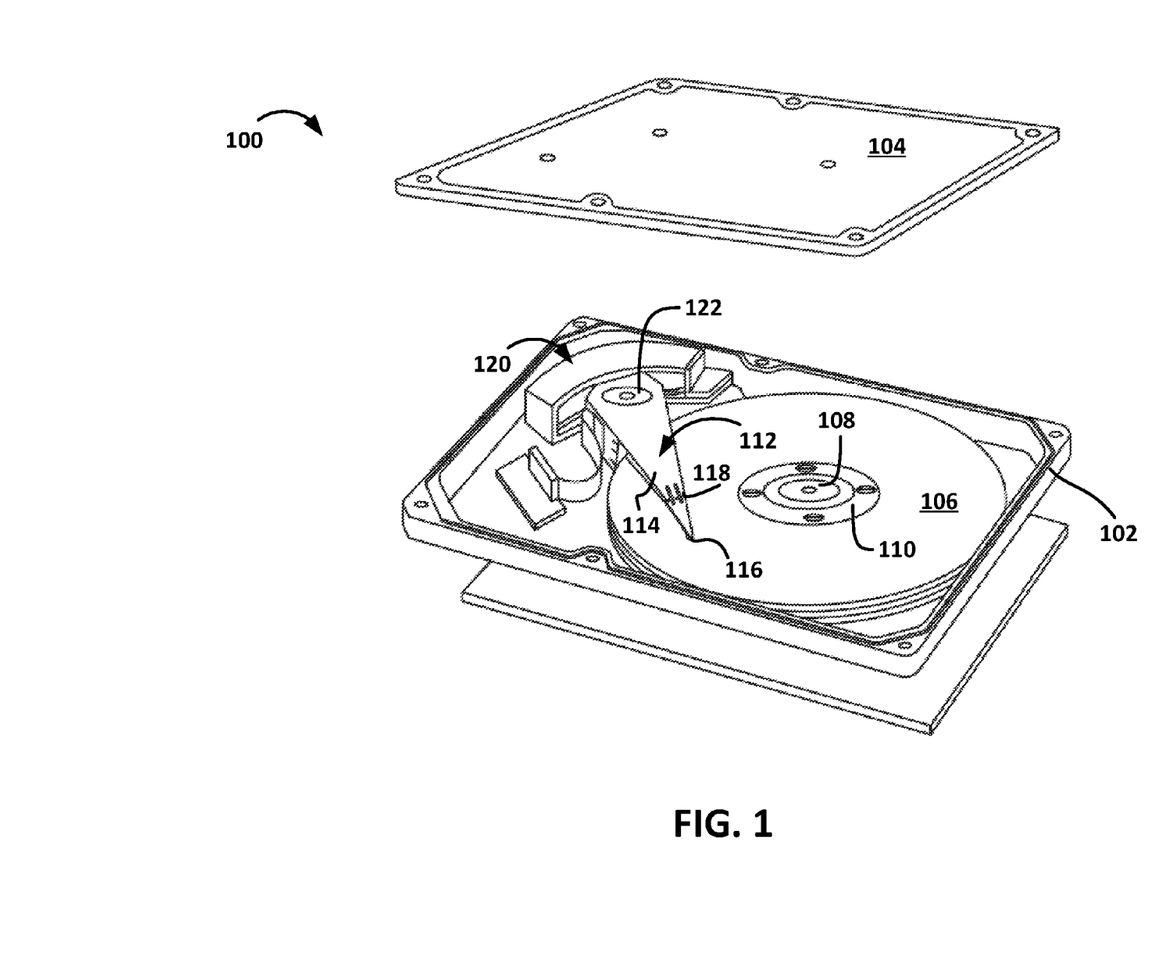
FIG. 1 shows an exploded, perspective view of a hard drive, in accordance with certain embodiments of the present disclosure.
Figure 2:
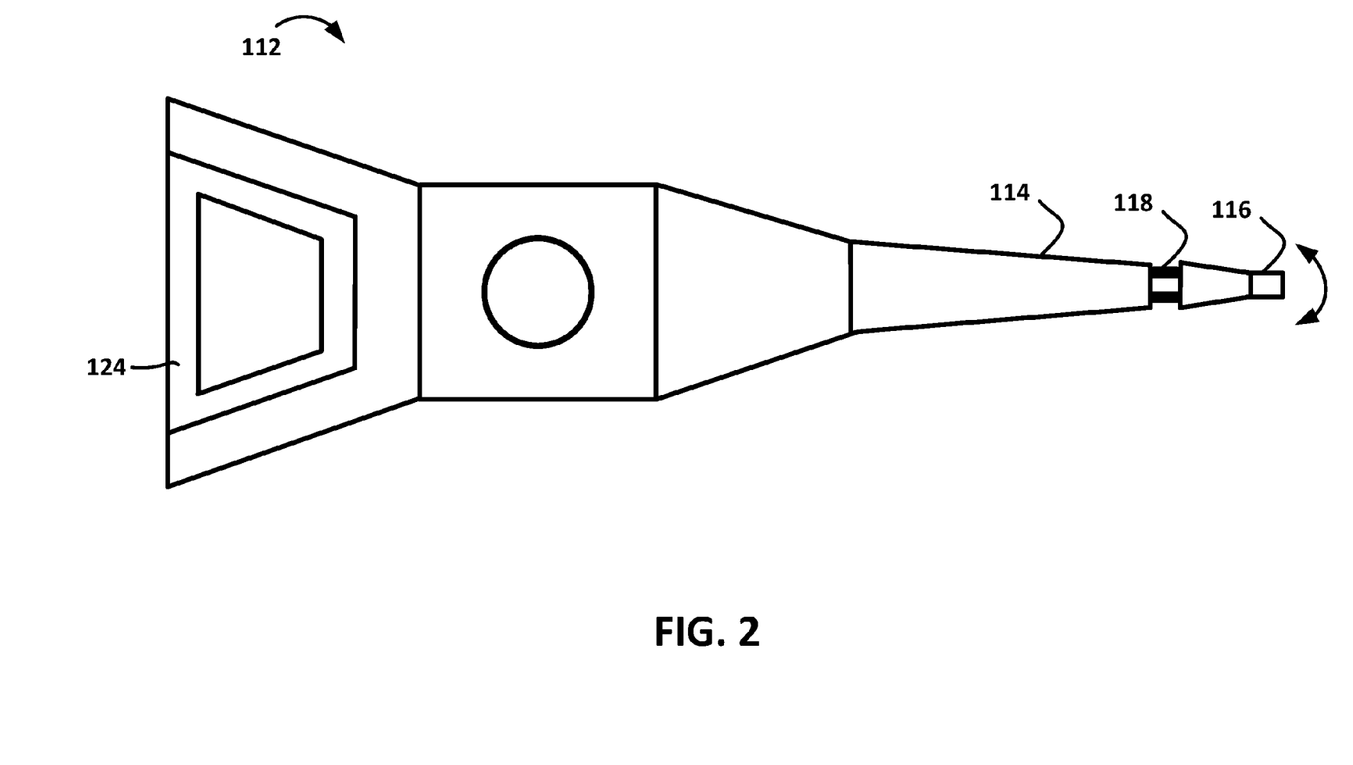
FIG. 2 shows a side view of an actuator assembly from FIG. 1.

FIG. 1 shows an exploded, perspective view of a hard drive 100 having a base deck 102 and top cover 104. The hard drive 100 includes magnetic recording disks 106 coupled to a spindle motor 108 by a disk clamp 110. The hard drive 100 also includes an actuator assembly 112 (shown in more detail in FIG. 2), which includes a suspension 114, that positions read/write heads 116 over data tracks on the magnetic records disks 106. In some embodiments, the actuator assembly 112 is a dual-stage actuator assembly in which each read/write head 116 is coupled to a microactuator 118 that—in addition to a voice coil motor (VCM) assembly 120—assists in positioning the read/write head 116 over a desired track on the magnetic recording disks 106. Each microactuator 118 can be positioned at least partially on or between the suspension 114 and one of the read/write heads 116. As appreciated by one skilled in the art, the read/write heads 116 may be coupled to the suspension 114 by a head-gimbal assembly (not shown). During operation, the spindle motor 108 rotates the magnetic recording discs 106 while the actuator assembly 112 is driven by the VCM assembly 120 to pivot around a pivot bearing 122. In some embodiments, the actuator assembly 120 does not include the microactuators 118 and therefore is known as a single-stage actuator assembly.

The hard drive 100 further includes a servo control system—discussed in more detail below—that controls rotation of the actuator assembly 112 via the VCM assembly 120 and/or controls actuation of the microactuators 118 to position the read/write heads 116 over a desired track on the magnetic recording disks 106 for reading and writing operations. The actuator assembly 112 may be coupled to the pivot bearing 122 by an adhesive or a tolerance ring (not shown).

The VCM assembly 120 (including a voice coil 124 shown in FIG. 2) and microactuator 118 are arranged to carry out various positioning operations (e.g., track seeking, track settling, track following) that position the read/write heads 116 over a desired track of the magnetic recording disks 106 to read data from or write data to a desired track. For example, in response to a command to read data from or write data to a track different from where a read/write head 116 is currently positioned (i.e., a track-seeking operation), a current may be applied to the voice coil 124 of the voice coil motor assembly 120 to rotate the actuator assembly 112 (and therefore the read/write head 116) towards the desired track. As the read/write head 116 nears the desired track, the microactuator 118 may be activated to assist the voice coil motor assembly 120 with settling the read/write head 116 over the desired track (i.e., a track-settling operation). For example, the microactuator 118 can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, the read/write head 116 will pivot (as denoted with arrows near the read/write head 116 in FIG. 2). Once the read/write head 116 is positioned over the desired track, the microactuator 118 may be used to compensate for small positioning errors (i.e., a track-follow operation). The microactuator 118 may be positioned anywhere on actuator assembly 112. For example, the microactuator 118 may be positioned between the suspension 114 and the read/write head 116. In certain embodiments, the suspension 114 is separated into multiple sections and the microactuator 118 may be positioned between the multiple sections. Moreover, the actuator assembly 112 may include multiple sets of microactuators. For example, the hard drive 100 may utilize a dual-, triple, or more-stage actuation system, which may refer to a number of actuation systems (e.g., voice coil motor assembly, microactuators) used by the hard drive 100 to position the read/write heads 116.

During operation, hard drives may experience internal disturbances and/or be subject to external disturbances (either of which can be referred to as shock events) that affect hard drive performance and can cause data reading and writing errors. External disturbances can include, for example, vibration in a computer chassis caused by acoustic signals generated by speakers coupled to the computer chassis. Internal disturbances can include one or more of the read/write heads 116 contacting the magnetic recording medium 106 or a particle, which induces vibration within the actuator assembly 112.

These disturbances may cause the actuator assembly 112 to vibrate to such an extent that the actuator assembly 112 is unable to accurately maintain a desired position over the magnetic recording disks 106. For example, the read/write heads 116 may be reading data from or writing data to a desired track on one of the magnetic recording disks 106 when a shock event occurs or while computer speakers play music. The shock event may cause the actuator assembly 112 and the read/write heads 116 to move off the desired track (i.e., off-track). This results in reduced performance and/or writing or reading errors because the read/write heads 116 are knocked off-track—making it difficult for a positioning system (e.g., servo control system) to correct the position of the actuator assembly 112 before the read or write operation is completed. An off-track writing error may result in a hard error where the read/write heads 116 write data to an unknown track, which may overwrite already-written data. An off-track reading error may result in an operation called a read retry where the hard drive 100 attempts to re-read the desired data, which can affect performance of a computer using the hard drive 100.

Figure 3:
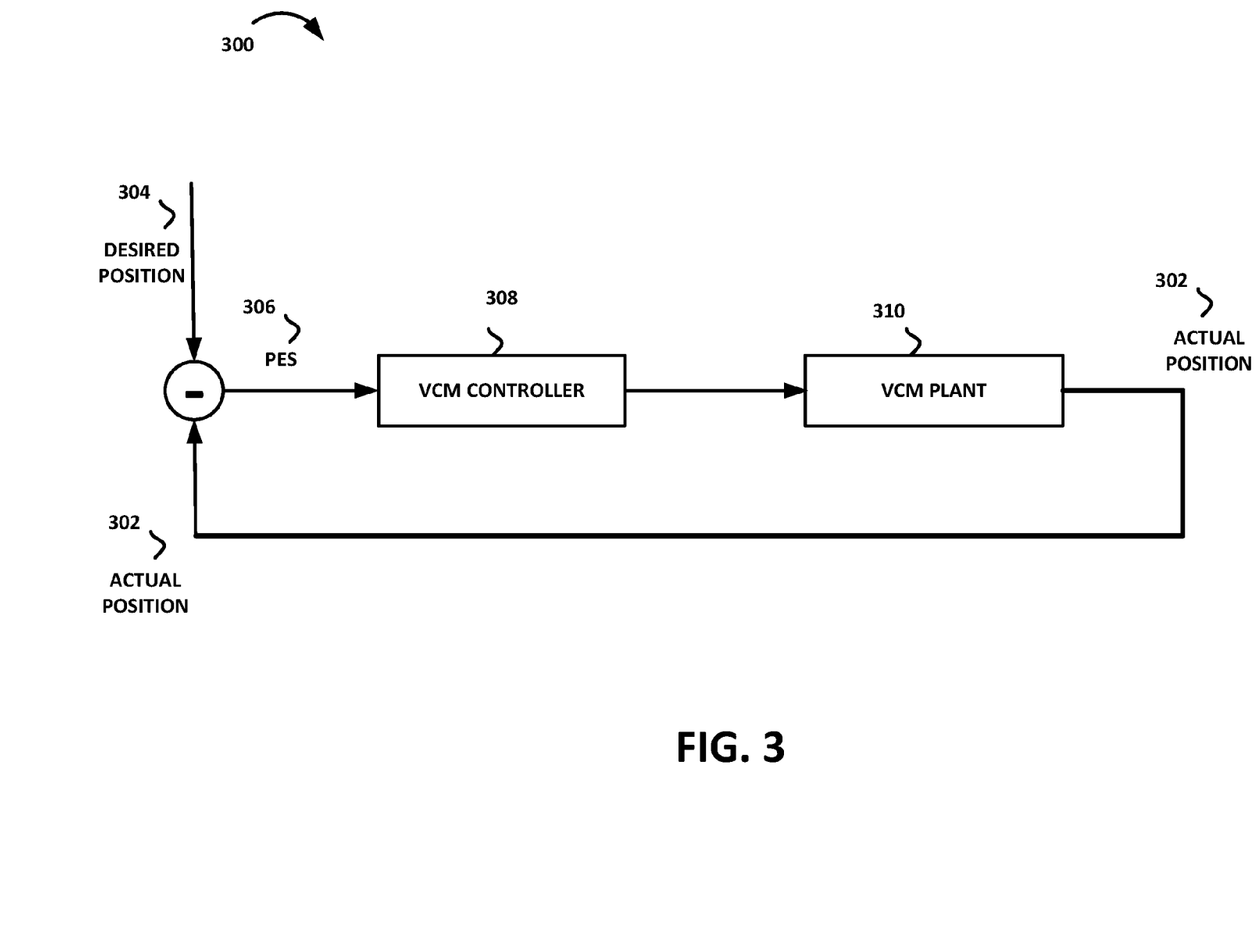
FIG. 3 shows a diagram of a single-stage servo control system, in accordance with certain embodiments of the present disclosure.

FIG. 3 provides a high-level representation of a single-stage servo control system 300 used to position read/write heads 116. In operation, a read/write head 116 reads servo data (e.g., positioning data) embedded on a magnetic recording disk 106 to determine an actual position 302 of the read/write head 116 relative to tracks on the magnetic recording disk 106. The actual position 302 of the read/write head 116 is subtracted from a desired position 304 of the read/write head 116 to determine a position error signal (PES) 306, which is the difference between where the read/write head 116 is and should be positioned.

Generally, the PES 306 is used to adjust a position of a read/write head 116 with respect to tracks on the magnetic recording disk 106 such that the read/write head 116 is positioned over the desired track. For example, the PES 306 is inputted to a voice coil motor (VCM) controller 308, which assists with controlling current applied to the voice coil 124 for rotating the actuator control assembly 112. The position of the read/write head 116 resulting from positioning the VCM is represented in FIG. 3 by VCM plant 310.

Figure 4:
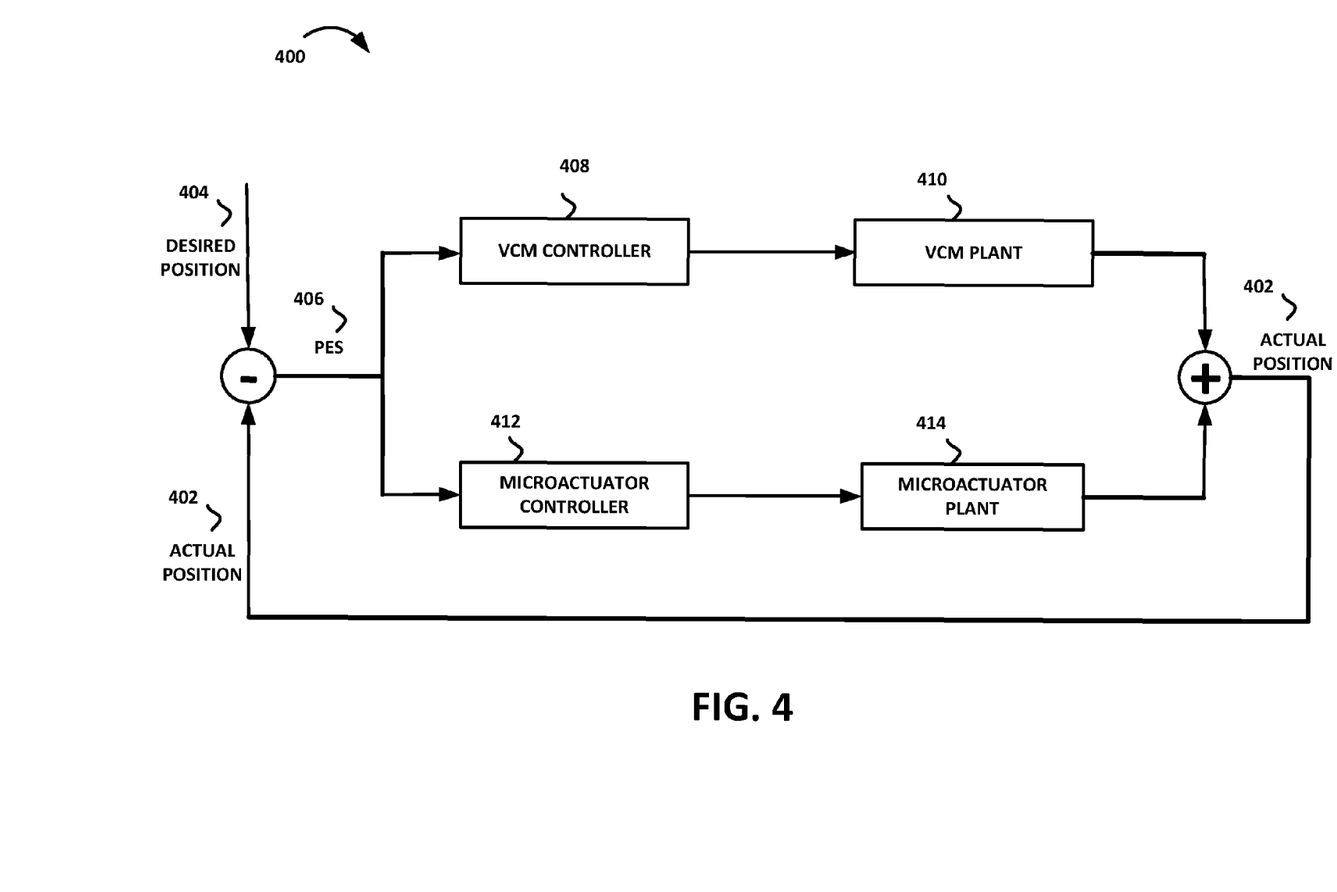
FIG. 4 shows a diagram of a dual-stage servo control system, in accordance with certain embodiments of the present disclosure.

FIG. 4 provides a high-level representation of a dual-stage servo control system 400 that features parallel control paths (e.g., feedback control loops) used to position read/write heads 116. In operation, a read/write head 116 reads servo data (e.g., positioning data) embedded on a magnetic recording disk 106 to determine an actual position 402 of the read/write head 116 relative to tracks on the magnetic recording disk 106. The actual position 402 of the read/write head 116 is subtracted from a desired position 404 of the read/write head 116 to determine a position error signal (PES) 406, which is the difference between where the read/write head 116 is and should be positioned.

Generally, the PES 406 is used to adjust a position of a read/write head 116 with respect to tracks on the magnetic recording disk 106 such that the read/write head 116 is positioned over the desired track. For example, the PES 406 is inputted to a VCM controller 408, which assists with controlling current applied to the voice coil 124 for rotating the actuator control assembly 112. The position of the read/write head 116 resulting from positioning the VCM is represented in FIG. 4 by VCM plant 410. In parallel, the PES 406 is also inputted to a microactuator controller 412, which assists with controlling voltage applied to the microactuator 118 (e.g., PZT elements) for pivoting the read/write head 116. The position of the read/write head 116 resulting from positioning the microactuator is represented in FIG. 4 by microactuator plant 414.

Figure 5:
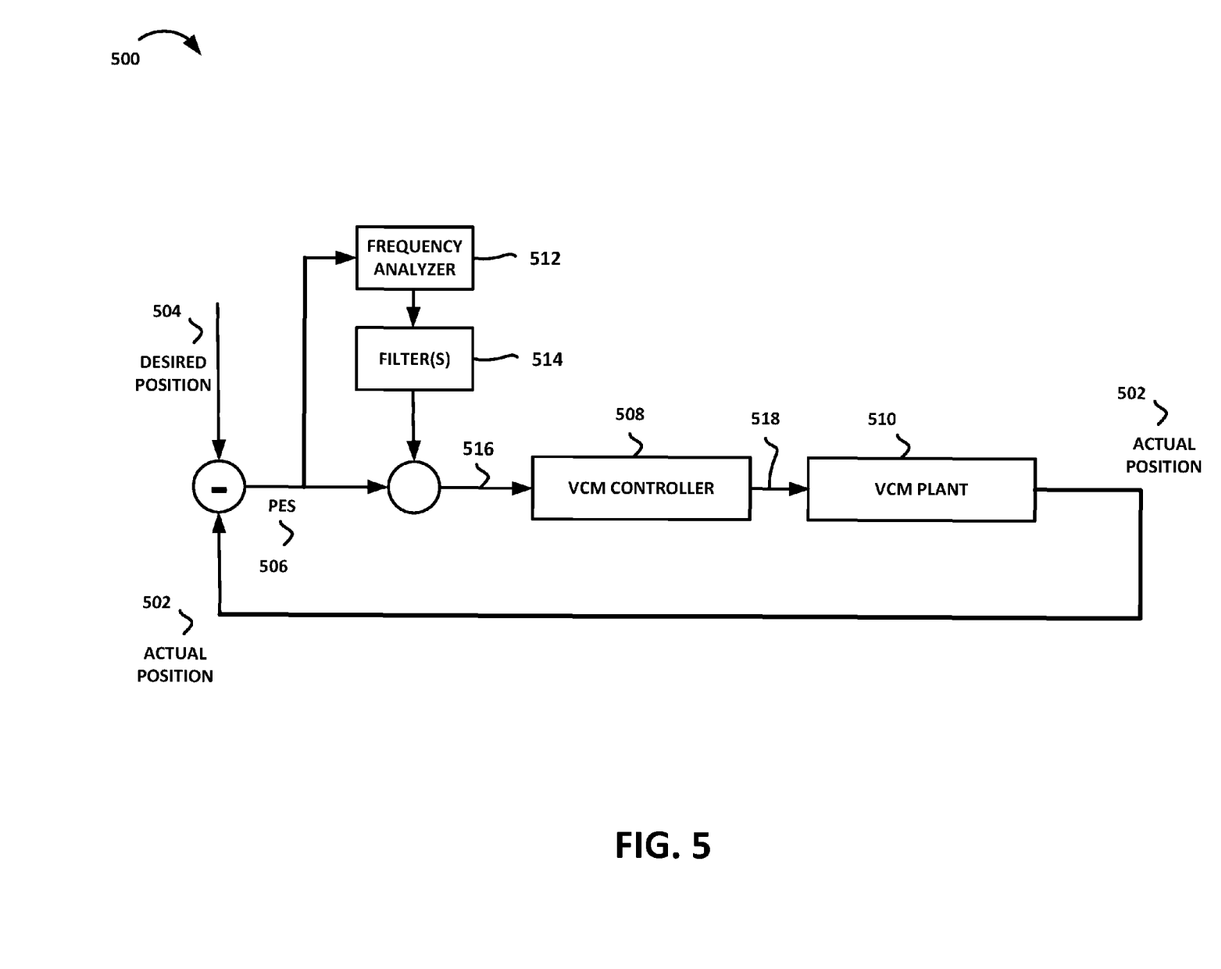
FIG. 5 shows a diagram of a single-stage servo control system, in accordance with certain embodiments of the present disclosure.
Figure 6:
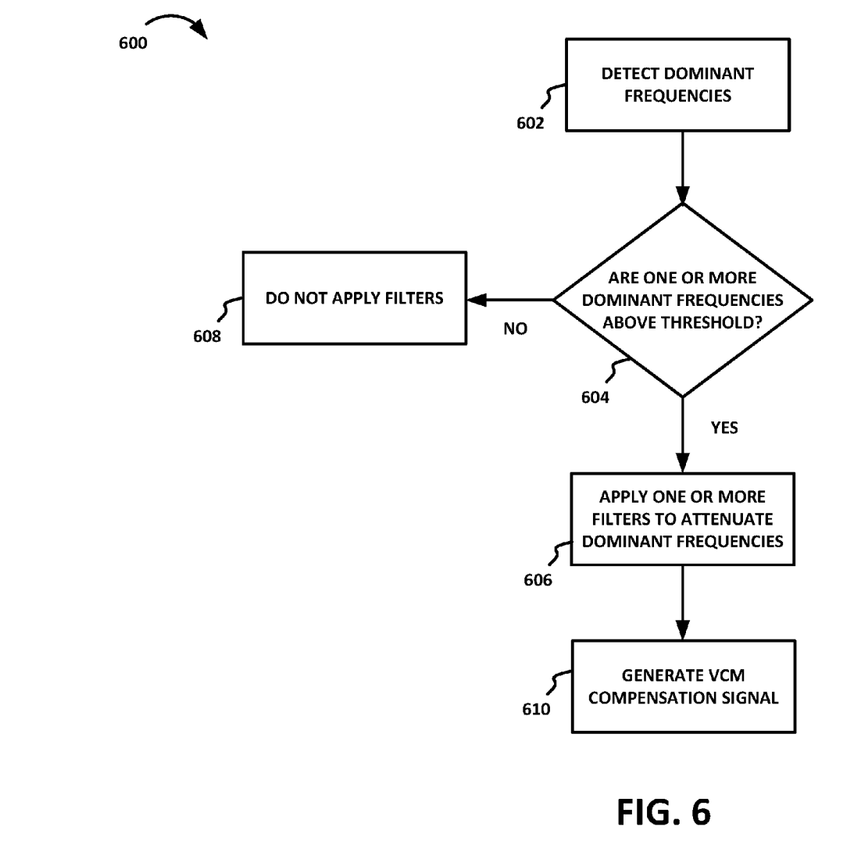
FIG. 6 shows a block representation of steps in a method for compensating for disturbance using the servo control system of FIG. 5, in accordance with certain embodiments of the present disclosure.

FIG. 5 shows an example single-stage servo control system 500 that utilizes one or more filters to compensate for disturbances. FIG. 6 shows various steps in a method 600 that can be carried out by the servo control system 500. Like the servo control system 300 of FIG. 3, the servo control system 500 subtracts an actual position 502 of a read/write head from a desired position 504 of the read/write head to determine a position error signal (PES) 506, which is the difference between where the read/write head is and should be positioned. PES 506 and/or a modified PES 506 (as explained in more detail below) is inputted to a VCM controller 508, which assists with controlling current applied to the voice coil 124 for rotating the actuator control assembly 112. The position of the read/write head by the VCM is represented in FIG. 5 by VCM plant 510.

The servo control system 500 also includes a frequency analyzer 512 and at least one filter 514. As shown in FIG. 5, the PES 506 is inputted into the frequency analyzer 512. In response to the PES 506, the frequency analyzer 512 is configured to detect one or more dominant frequencies of the PES 506 (step 602). In some embodiments, the dominant frequencies (e.g., peaks) of the PES 506 are detected by computing a fast fourier transform (FFT) of the PES 506. The computed FFT can be used to identify the frequencies/harmonics with the most energy which indicate that such frequencies/harmonics should be attenuated to help compensate for disturbances. As described below, the detected dominant frequencies can be used by the at least one filter 514 to determine whether certain filters should be applied to the PES 506 to help attenuate the dominant frequencies.

As shown in FIG. 5, the PES 506 can be inputted into the at least one filter 514. The at least one filter 514 is configured to be applied to the PES 506 and to generate a VCM compensation signal 516 (steps 606 and 610). In some embodiments, the at least one filter 514 includes filters such as notch filters with predetermined parameters. For example, the predefined notch filters can each include a predetermined center frequency, bandwidth, and/or depth. In some embodiments, the servo control system 500 can chose and apply the at least one filter 514 from a library of 10-50 predefined filters, 10-40 predefined filters, or 20-30 predefined filters. In some embodiments, the at least one filter 514 is a second order filter. In some embodiments, the at least one filter 514 is an infinite impulse response filter.

In some embodiments, the at least one filter 514 is applied to the PES 506 in response to determining the detected one or more dominant frequencies are above a threshold (e.g., amplitude, energy) (steps 604 and 606). In such an embodiment, if the threshold is not breached, not one of the at least one filter 514 is applied to the PES 506 (steps 604 and 608). In some embodiments, the at least one filter 514 is applied in response to detecting the one or more dominant frequencies. For example, if one of the detected dominant frequencies is at 2 kHz, then the at least one filter 514 could be applied to attenuate frequencies at or around 2 kHz. The applied filter could include a predetermined bandwidth (e.g., 100 Hz, 200 Hz, 500 Hz, 1 kHz), center frequency near the detected dominant frequency, and depth. In some embodiments, the at least one filter 514 applies only a single filter to the PES 506. In some embodiments, the at least one filter 514 applies multiple filters to the PES 506. For example, in response to the frequency analyzer 512 detecting multiple dominant frequencies, the at least one filter 514 can apply separate predefined filters to attenuate each of the dominant frequencies. In some embodiments, each filter is applied only if at least one of the dominant frequencies is above a predetermined threshold (steps 604 and 608). In some embodiments, the at least one filter 514 is configured to apply filters that attenuate frequencies up to 10 kHz. In some embodiments, the at least one filter 514 is configured to apply filters that attenuate frequencies from 100 Hz-10 kHz, 500 Hz-10 kHz, 1-10 kHz.

The VCM controller 508 is configured to generate a VCM control signal 518 in response to the VCM compensation signal 516. As referred to above, the VCM control signal 518 is used to control current applied to the voice coil 124 for rotating the actuator control assembly 112.

The above-described single-stage servo control system 500 utilizes the frequency analyzer 512 and the at least one filter 514 to compensate for disturbances. The at least one filter 514 includes filters that are pre-defined for selected frequencies and that are applied in response to detecting peaks in the PES 506. The at least one filter 514 can be applied in real time to compensate for disturbances. The disturbance compensation is carried out via the VCM control signal 518 such that the VCM assembly 120 adjusts the position of the actuator assembly 112 and therefore the read/write head 116.

Figure 7:
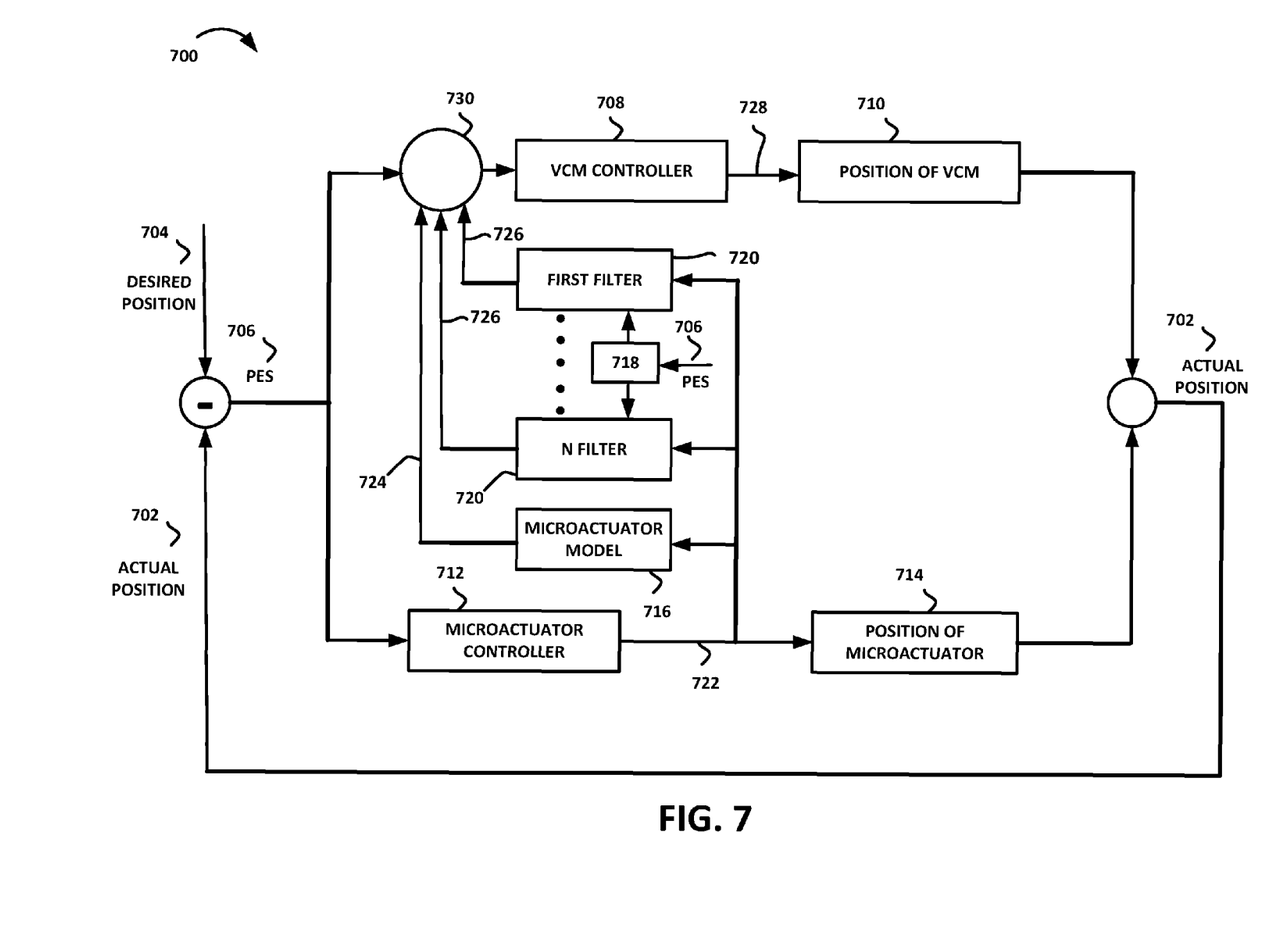
FIG. 7 shows a diagram of a dual-stage servo control system, in accordance with certain embodiments of the present disclosure.
Figure 8:
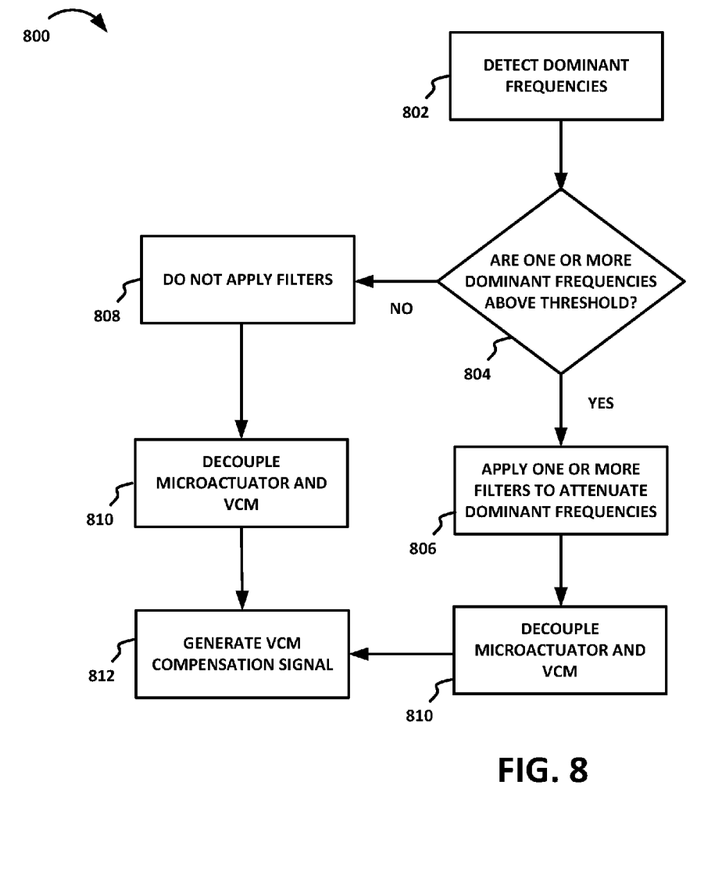
FIG. 8 shows a block representation of steps in a method for compensating for disturbance using the servo control system of FIG. 7, in accordance with certain embodiments of the present disclosure.

FIG. 7 shows an example dual-stage servo control system 700 that utilizes one or more filters to compensate for disturbances. FIG. 8 shows various steps in a method 800 that can be carried out by the servo control system 700. Like the servo control system 400 of FIG. 4, the servo control system 700 subtracts an actual position 702 of a read/write head from a desired position 704 of the read/write head to determine a position error signal (PES) 706, which is the difference between where the read/write head is and should be positioned. PES 706 and/or a modified PES 706 is inputted to a VCM controller 708 and/or a microactuator controller 712 to position the read/write head 116. The position of the read/write head by the VCM is represented in FIG. 7 by VCM plant 710, and the position of the read/write head resulting from position of the microactuator is represented by microactuator plant 714.

The servo control system 700 also includes a microactuator model 716, frequency analyzer 718, and at least one filter 720 represented in FIG. 7 by a first filter through N-number of filters. The microactuator model 716 is configured to decouple the microactuator control loop and the VCM control loop such that positioning of the VCM assembly 120 via the VCM controller 708 is decoupled from positioning of the microactuator via the microactuator controller 712 (step 810). The microactuator model 716 estimates the position of the microactuator 714 in response to microactuator controller's microactuator control signal 722, which is used to position the microactuator via an applied voltage. The microactuator model 716 is configured to generate a decoupling signal 724 in response to the microactuator control signal 722, and the decoupling signal 724 is used by the VCM controller 708, among other things, to position actuator assembly 112 via the VCM assembly 120.

As shown in FIG. 7, the PES 706 is inputted into the frequency analyzer 718. In response to the PES 706, the frequency analyzer 718 is configured to detect one or more dominant frequencies of the PES 706 (step 802). Like the frequency analyzer 512 of FIG. 5, in some embodiments, the dominant frequencies (e.g., peaks) are detected by computing a fast fourier transform (FFT) of the PES 706. The computed FFT can be used to identify the frequencies/harmonics with the most energy which indicate that such frequencies/harmonics should be attenuated to help compensate for disturbances. As described below, the detected dominant frequencies can be used by the at least one filter 720 to determine whether certain filters should be applied to the PES 706 to help attenuate the dominant frequencies.

As shown in FIG. 7, the microactuator control signal 722 are inputted into the at least one filter 720 (e.g., first filter, n filter). The at least one filter 720 is configured to be applied to the microactuator control signal 722 and to generate one or more VCM compensation signals 726 (steps 806 and 812), which, in some embodiments, can be summed together to form one VCM compensation signal 726. In some embodiments, the at least one filter 720 includes filters such as notch filters with predetermined parameters. For example, the predefined notch filters can each include a predetermined center frequency, bandwidth, and/or depth. In some embodiments, the servo control system 700 can chose and apply the at least one filter 720 from a library of 10-50 predefined filters, 10-40 predefined filters, or 20-30 predefined filters. In some embodiments, the at least one filter 720 is a second order filter. In some embodiments, the at least one filter 720 is an infinite impulse response.

In some embodiments, the at least one filter 720 is applied to the microactuator control signal 722 in response to determining the detected one or more dominant frequencies are above a threshold (e.g., amplitude, energy) (steps 804 and 806). In such an embodiment, if the threshold is not breached, not one of the at least one filter 720 is applied to the microactuator control signal 722 (steps 804 and 808). In some embodiments, the at least one filter 720 is applied in response to detecting the one or more dominant frequencies. For example, if one of the detected dominant frequencies is at 2 kHz, then the at least one filter 720 could be applied to attenuate frequencies at or around 2 kHz. The applied filter could include a predetermined bandwidth (e.g., 100 Hz, 200 Hz, 500 Hz, 1 kHz), center frequency near the detected dominant frequency, and depth. In some embodiments, the at least one filter 720 applies only a single filter to the microactuator control signal 722. In some embodiments, the at least one filter 720 applies multiple filters (e.g., first filter, n filter) to the microactuator control signal 722. For example, in response to the frequency analyzer 720 detecting multiple dominant frequencies, the at least one filter 720 can apply separate predefined filters to attenuate each of the dominant frequencies. In some embodiments, each filter is applied only if at least one of the dominant frequencies is above a predetermined threshold (steps 804 and 808). In some embodiments, the at least one filter 720 is configured to apply filters that attenuate frequencies up to 10 kHz. In some embodiments, the at least one filter 514 is configured to apply filters that attenuate frequencies from 100 Hz-10 kHz, 500 Hz-10 kHz, 1-10 kHz.

The VCM controller 708 is configured to generate a VCM control signal 728 in response to the VCM compensation signal 726, the decoupling signal 724, and the PES 706. In some embodiments, the VCM compensation signal 726 and the decoupling signal 724 are injected into the PES 706 at an adder or subtracter 730 prior to use by the VCM controller 708. As referred to above, the VCM control signal 728 is used to control current applied to the voice coil 124 for rotating the actuator control assembly 112.

The above-described dual-stage servo control system 700 utilizes the frequency analyzer 718 and the at least one filter 720 to compensate for disturbances. The at least one filter 720 includes filters that are pre-defined for selected frequencies and that are applied in response to detecting peaks in the PES 706. The at least one filter 720 can be applied in real time to compensate for disturbances. The disturbance compensation is carried out via the VCM control signal 728 such that the VCM assembly 120 adjusts the position of the actuator assembly 112 and therefore the read/write head 116. Moreover, because microactuators have limited a range of positioning (e.g., stroke), compensating for disturbances via the VCM signal 728 can reduce the likelihood that the microactuator reaches its limit (e.g., saturates).

Figure 9:
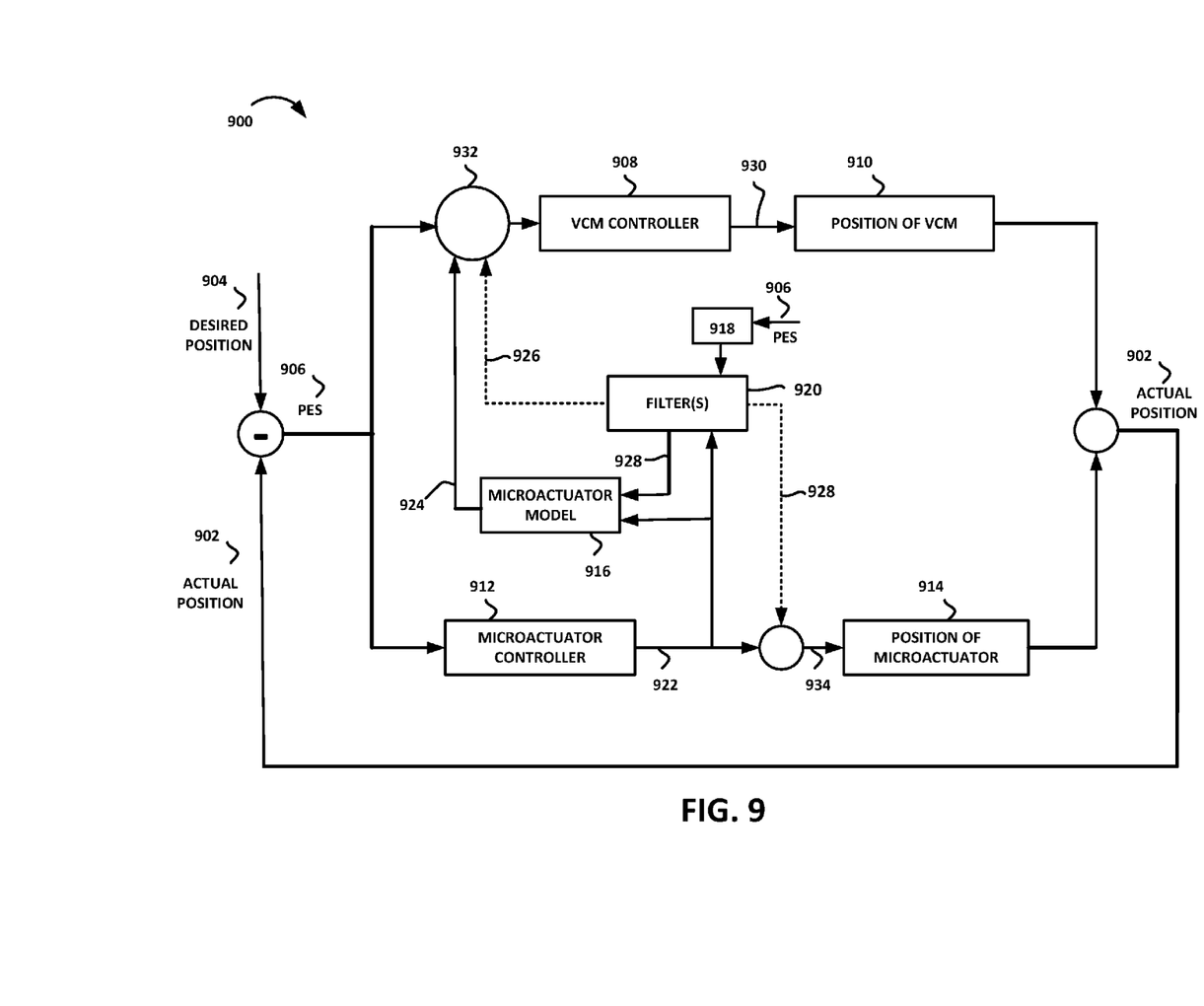
FIG. 9 shows a diagram of a dual-stage servo control system, in accordance with certain embodiments of the present disclosure.
Figure 10:
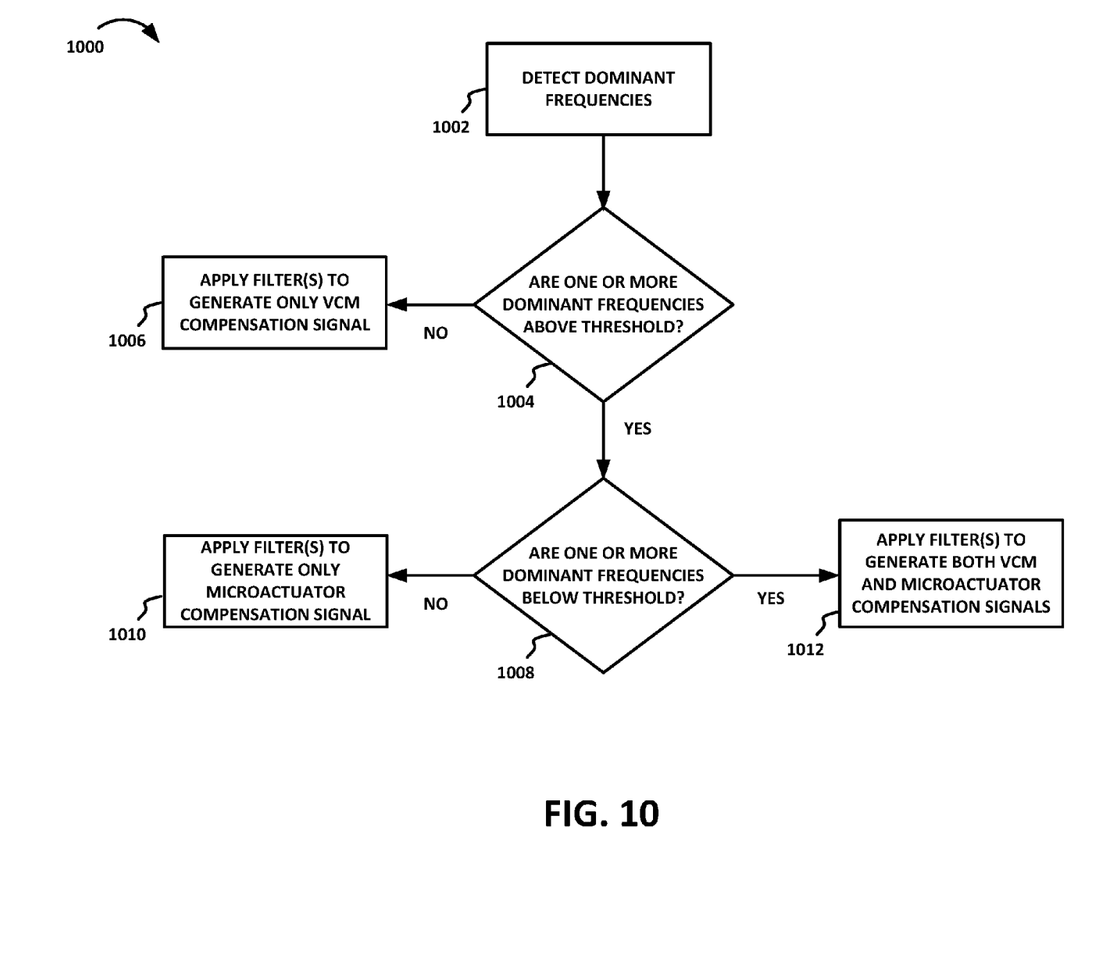
FIG. 10 shows a block representation of steps in a method for compensating for disturbance using the servo control system of FIG. 9, in accordance with certain embodiments of the present disclosure.

FIG. 9 shows an example dual-stage servo control system 900 that utilizes one or more filters to compensate for disturbances. FIG. 10 shows various steps in a method 1000 that can be carried out by the servo control system 900. Like the servo control system 400 of FIG. 4, the servo control system 900 subtracts an actual position 902 of a read/write head from a desired position 904 of the read/write head to determine a position error signal (PES) 906, which is the difference between where the read/write head is and should be positioned. PES 906 and/or a modified PES 906 is inputted to a VCM controller 908 and/or a microactuator controller 912 to position the read/write head 116. The position of the read/write head by the VCM is represented in FIG. 9 by VCM plant 910, and the position of the read/write head resulting from position of the microactuator is represented by microactuator plant 914.

The servo control system 900 also includes a microactuator model 916, frequency analyzer 918, and at least one filter 920. The microactuator model 916 is configured to decouple the microactuator controller 912 and the VCM controller 908 such that positioning of the VCM assembly 120 via the VCM controller 908 is decoupled from positioning of the microactuator via the microactuator controller 912. The microactuator model 916 estimates the position of the microactuator 914 in response to microactuator controller's microactuator control signal 922, which is used to position the microactuator via an applied voltage. The microactuator model 916 is configured to generate a decoupling signal 924 in response to the microactuator control signal 922, and the decoupling signal 924 is used by the VCM controller 908, among other things, to position actuator assembly 112 via the VCM assembly 120.

As shown in FIG. 9, the PES 906 is inputted into the frequency analyzer 918. In response to the PES 906, the frequency analyzer 918 is configured to detect one or more dominant frequencies of the PES 906 (step 1002). Like the frequency analyzer 512 of FIG. 5, in some embodiments, the dominant frequencies (e.g., peaks) are detected by computing a fast fourier transform (FFT) of the PES 906. The computed FFT can be used to identify the frequencies/harmonics with the most energy which indicate that such frequencies/harmonics should be attenuated to help compensate for disturbances. As described below, the detected dominant frequencies can be used by the at least one filter 920 to determine whether certain filters should be applied to the PES 906 to help attenuate the dominant frequencies.

As shown in FIG. 9, the microactuator control signal 922 is inputted into the at least one filter 920. The at least one filter 920 is configured to be applied to the microactuator control signal 922 and to generate one or more VCM compensation signals 926 and/or one or more microactuator compensation signals 928 (steps 1004-1012).

In some embodiments, the at least one filter 920 includes filters such as notch filters with predetermined parameters. For example, the predefined notch filters can each include a predetermined center frequency, bandwidth, and/or depth. In some embodiments, the servo control system 900 can chose and apply the at least one filter 920 from a library of 10-50 predefined filters, 10-40 predefined filters, or 20-30 predefined filters. In some embodiments, the at least one filter 920 is a second order filter. In some embodiments, the at least one filter 920 is an infinite impulse response.

In some embodiments, the at least one filter 920 is applied to the microactuator control signal 922 in response to determining the detected one or more dominant frequencies are above a threshold (e.g., amplitude, energy). In some embodiments, whether the at least one filter 920 is to generate the VCM compensation signal 926 or the microactuator compensation signal 928 depends on whether the dominant frequencies are above or below a threshold (step 1008). For example, the VCM assembly 120 is better suited to be used to compensate for lower-frequency disturbances compared to the microactuators 118. As such, the threshold may be set such that the at least one filter 920 applies one or more filters configured to attenuate higher frequency disturbances. In this case, the applied filters can be used to generate the microactuator compensation signal 928, which is used to position the microactuator. In some embodiments, such a threshold is 4-6 kHz. In some embodiments where multiple filters are applied to the microactuator control signal 922, one or more filters can be applied to generate both the VCM compensation signal 926 and the microactuator compensation signal 928 (step 1012)

In some embodiments, the at least one filter 920 is applied in response to detecting the one or more dominant frequencies. For example, if one of the detected dominant frequencies is at 2 kHz, then the at least one filter 920 could be applied to attenuate frequencies around 2 kHz. The applied filter could include a predetermined bandwidth (e.g., 100 Hz, 200 Hz, 500 Hz, 1 kHz), center frequency near the detected dominant frequency, and depth. In some embodiments, the at least one filter 920 applies only a single filter to the microactuator control signal 922. In some embodiments, the at least one filter 920 applies multiple filters to the microactuator control signal 922. For example, in response to the frequency analyzer 920 detecting multiple dominant frequencies, the at least one filter 920 can apply separate predefined filters to attenuate each of the dominant frequencies. In some embodiments, each filter is applied only if at least one of the dominant frequencies is above a predetermined threshold. In some embodiments, the at least one filter 920 is configured to apply filters that attenuate frequencies up to 10 kHz. In some embodiments, the at least one filter 920 is configured to apply filters that attenuate frequencies from 100 Hz-10 kHz, 500 Hz-10 kHz, 1-10 kHz, 100 Hz—Nyquist frequency of the servo control system.

The VCM controller 908 is configured to generate a VCM control signal 928 in response to the VCM compensation signal 926, the decoupling signal 924, and the PES 906. In some embodiments, the VCM compensation signal 926 and the decoupling signal 924 are injected into the PES 906 at an adder or subtracter 932 prior to use by the VCM controller 908. As referred to above, the VCM control signal 928 is used to control current applied to the voice coil 124 for rotating the actuator control assembly 112.

As shown in FIG. 9, the microactuator compensation signal 928 is used to modify the microactuator control signal 922 to generate a modified microactuator control signal 934, which is used to position the microactuator. In some embodiments, the microactuator compensation signal 928 is inputted to the microactuator model 916, which generates the VCM compensation signal 926.

The above-described dual-stage servo control system 900 utilizes the frequency analyzer 918 and the at least one filter 920 to compensate for disturbances. The at least one filter 920 includes filters that are pre-defined for selected frequencies and that are applied in response to detecting peaks in the PES 906. The at least one filter 920 can be applied in real time to compensate for disturbances. The disturbance compensation is carried out via the VCM control signal 930 such that the VCM assembly 120 adjusts the position of the actuator assembly 112 (and therefore the read/write head 116) and/or the modified microactuator control signal 934 such that the microactuator 112 adjusts the position of the read/write head 116.

The various embodiments and components described above may be implemented using firmware, integrated circuits, and/or software modules that interact with each other or are combined together, for example, in one or more controllers. For example, the control diagrams illustrated herein may be used to create computer-readable instructions/code for execution by a processor. Such instructions may be stored on a non-transitory computer-readable medium and transferred to a processor for execution. In another example, the embodiments and components described above, such as components of the various servo control systems described above and shown in the figures, are implemented in one or more application-specific integrated circuits (ASIC), field-programmable gate arrays (FPGA), and/or other circuitry. The structures and procedures shown above are only a representative example of embodiments that can be used to provide the functions described hereinabove.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:
    frequency analyzer circuitry configured to detect one or more dominant frequencies of a position error signal (PES);
    filter circuitry configured to:
        identify one or more filters in response to detecting the one or more dominant frequencies,
        apply the one or more identified filters to at least one of a microactuator control signal and PES, and
        generate a voice coil motor (VCM) compensation signal in response to the filtered PES or the microactuator control signal; and
    VCM control circuitry configured to generate a VCM control signal in response to the VCM compensation signal.

2. The apparatus of claim 1, further comprising:
    microactuator control circuitry configured to generate the microactuator control signal in response to the PES.

3. The apparatus of claim 2, further comprising:
    microactuator model circuitry configured to generate a decoupling signal in response to the microactuator control signal.

4. The apparatus of claim 3, wherein the VCM control circuitry is further configured to generate the VCM control signal in response to the decoupling signal.

5. The apparatus of claim 1, wherein the one or more filters are predetermined filters.

6. The apparatus of claim 5, wherein the predetermined filters include a predetermined bandwidth and center frequency.

7. The apparatus of claim 1, wherein the frequency analyzer circuitry is configured to identify a single filter in response to identifying the one or more dominant frequencies.

8. The apparatus of claim 1, wherein the filter circuitry is configured to apply the one or more identified filters to the PES or the microactuator control signals upon detecting that at least one of the one or more dominant frequencies is above a threshold.

9. The apparatus of claim 1, wherein the filter circuitry is further configured to generate a microactuator compensation signal in response to the filtered PES.

10. The apparatus of claim 9, wherein the microactuator compensation signal is generated in response to the at least one of the one or more dominant frequencies being above a frequency threshold.

11. The apparatus of claim 1, wherein the frequency analyzer circuitry, the filter circuitry, and the VCM control circuitry are part of a single controller.

12. A method comprising:
    detecting one or more dominant frequencies of a position error signal (PES);
    identifying one or more filters in response to detecting the one or more dominant frequencies;
    applying the one or more identified filters to either the PES or a microactuator control signal;
    generating a voice coil motor (VCM) compensation signal in response to the filtered PES or filtered microactuator control signal; and
    generating a VCM control signal in response to the VCM compensation signal.

13. The method of claim 12, further comprising:
    generating a decoupling signal in response to a microactuator control signal, wherein the VCM control signal is generated in response to the decoupling signal.

14. The method of claim 12, further comprising:
    generating a microactuator control signal in response to the filtered PES or filtered microactuator control signal.

15. The method of claim 14, further comprising:
    detecting that the one or more dominant frequencies is above a threshold, wherein the microactuator control signal is generated in response to detecting that the one or more dominant frequencies is above the threshold.

16. The method of claim 12, wherein the one or more filters are predetermined filters.

17. The method of claim 16, wherein the predetermined filters include a predetermined bandwidth and center frequency.

18. The method of claim 12, further comprising:
    detecting that at least one of the one or more dominant frequencies is above a threshold, wherein the one or more identified filters is applied to the PES upon detecting that at least one of the one or more dominant frequencies is above a threshold.

* * * * *